March 10, 1970   J. F. CLARKE   3,499,804
HEAT TREATMENT OF CLAD WIRE OR THE LIKE
Filed Nov. 7, 1966
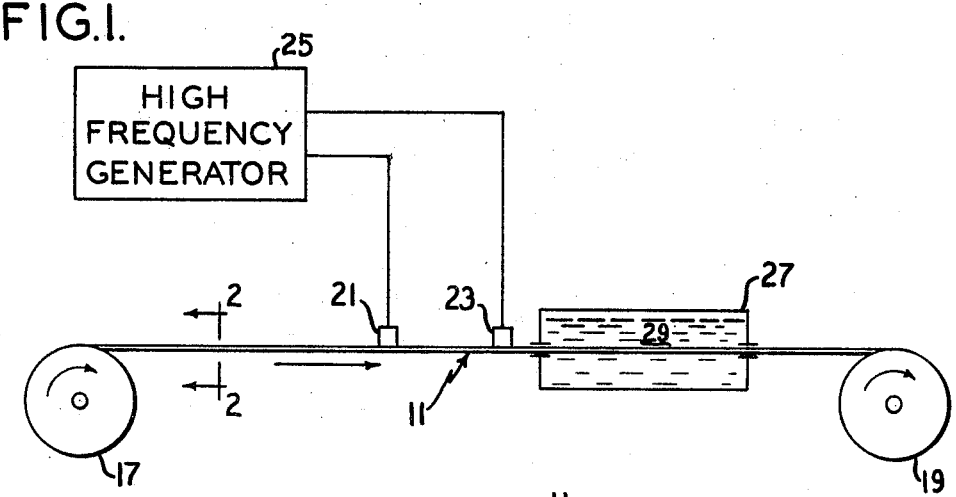
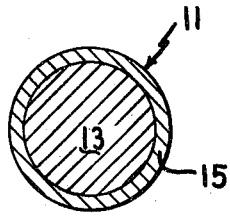
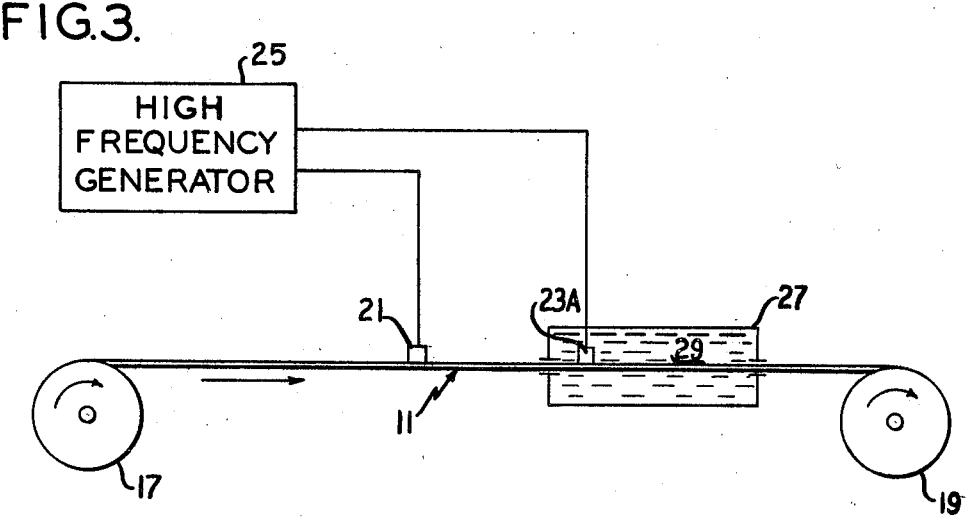
John F. Clarke,
Inventor.
Koenig, Senniger, Powers and Leavitt,
Attorneys.

United States Patent Office 3,499,804
Patented Mar. 10, 1970

3,499,804
HEAT TREATMENT OF CLAD WIRE OR THE LIKE
John F. Clarke, Attleboro, Mass., assignor to Texas Instruments Incorporated, Dallas, Tex., a corporation of Delaware
Filed Nov. 7, 1966, Ser. No. 592,611
Int. Cl. C21d 1/10, 1/40, 1/42
U.S. Cl. 148—127                                    3 Claims

ABSTRACT OF THE DISCLOSURE

Metallurgically bonded metal-clad wire is continuously moved in electrical connection of its cladding with spaced terminals of a high frequency electric circuit and then immediately quenched by direct immersion in a quenching bath. Thus an electrical skin heating occurs in the cladding for preferentially annealing it without substantially heating the core or the interface between it and the cladding thereby preventing any substantial formation of brittle intermetallic compounds at said interface between the core and cladding while selectively annealing the cladding.

---

In manufacturing clad wire in which a metal core is covered with a bonded cladding layer of a different metal, it is often desirable to heat-treat the cladding layer without substantially heating the core. For example, in manufacturing hard aluminum wire clad with copper, it is useful to anneal the copper before drawing the wire since the yield strength of annealed or soft copper is approximately the same as hard aluminum. It is further desirable to avoid overall heating of the wire since such overall heating will cause a relatively brittle intermetallic compound to form at the interfacial bond between the copper and the aluminum. This is particularly true when the core and the cladding are solid-phase bonded. A solid-phase bond is one form of a metallurgical bond.

Among the several objects of the invention may be noted the provision of a method for preferentially heat-treating the cladding of a clad wire; the provision of such a method which does not involve substantial or equal heating of the core metal of clad wire so that their working characteristics can be better matched; the provision of such a method by means of which very thin cladding layers may successfully be selectively heat-treated; and the provision of such a method which may be accomplished rapidly and economically. Other objects and features will be in part apparent and in part pointed out hereinafter.

In practicing the method, the wire is moved at a suitable speed past and in engagement with at least one electrical contact and then into a quenching liquid. A high-frequency alternating current is passed through the contact and a length of the wire substantially immediately ahead of the quenching liquid for selectively skin-heating the cladding of the wire to a desired temperature. The wire is quenched substantially immediately after the outer layer has been heated and before any appreciable amount of heat flows from the cladding into the core of the wire. Thus the cladding of the wire may be selectively heat-treated without substantial heating of the core. It will be understood that the core may be solid or tubular and in either case solid or composite, and that the cladding may consist of one or more layers. For purposes of disclosure, the invention will be described in connection with a solid core and a single-layer cladding. The term wire as used herein includes like products such as rods, tubes and the like.

The invention accordingly comprises the constructions and methods hereinafter described, the scope of the invention being indicated in the following claims.

In the accompanying drawings, in which various possible embodiments of the invention are illustrated, FIG. 1 shows apparatus for applying heat treatment according to the present invention;

FIG. 2 is a cross section substantially on line 2—2 of FIG. 1; and

FIG. 3 shows a modification of the apparatus of FIG. 1.

Corresponding reference characters indicate corresponding parts throughout the several views of the drawings.

Referring now to FIGS. 1 and 2, there is indicated at 11 a clad wire having a solid core 13 of aluminum and an outer cladding consisting of a single layer 15 of copper solid-phase bonded thereto. As above noted, the core might be tubular and the cladding consist of several layers.

Wire 11 is moved between a pay-off coiler 17 and a take-up coiler 19 which are rotated by conventional drive means (not shown) for moving the wire 11 at a substantially constant speed past and in contact with a pair of spaced electrical contacts 21 and 23. A high-frequency generator 25 is connected to contacts 21 and 23 for passing a suitable amount of current along the length of wire between the contacts to provide the heating desired. Immediately after passing the second contact 23, the wire enters a tank 27 of an appropriate quenching liquid 29 such as, for example, water, which abstracts a substantial quantity of the heat from the cladding before any substantial amount of heat can reach the core by heat conduction, and preferably before the heat in any substantial quantity crosses the bonded interface between the core and the cladding. As the wire passes between contacts 21 and 23, the high-frequency electric current flowing along the wire selectively heats the layer 15 by resistive dissipation caused by the known skin-heating effects of high-frequency currents. This skin-heating effect achieves a much steeper temperature gradient from the surface of the wire toward the core than can be accomplished by high-frequency induction heating often employed for surface heating. Further, the depth and extent of heating may be varied in known manner by varying the frequency and duration of the applied heating current in a given portion of the wire. For example, a 0.010 inch cladding of copper on 0.125 inch diameter aluminum wire may be selectively annealed by surface-heating the wire with 500 kilocycle A.C. over a current-conductive distance of 2 inches with the wire traveling at 500 ft./min. and then passing immediately through several feet of cooling water, as for example, two or three feet. The heating time of any point on the surface traveling over the said 2 inches of distance at 500 ft./min. will be 20 milliseconds, as a simple arithmetical conversion shows.

As wire 11 immediately enters into the quenching liquid 29 after passing the second contact 23, the heated outer layer 15 is cooled before there is any appreciable heat flow from this layer into the core 13. Thus the copper cladding 15 is annealed but the aluminum core 13 is not. Similarly, there is insufficient heating at the interfacial bond between the two layers to cause any substantial production of intermetallic compounds of these metals. Such compounds are relatively brittle and would tend to crack under further drawing operations.

While in FIG. 1 the second contact 23 is shown outside the quenching liquid, this second contact may be located within the tank as is illustrated at 23A in FIG. 3. In this case the effective distance over which the high-frequency current causes heating is the distance between the first contact 21 and the initial encounter with the quenching liquid. Any further resistance-heating of the wire is overcome by the quenching action of the liquid 29. The second contact may, in fact, be constituted by the liquid itself, as by separating contact 23A from the wire 11 within the liquid 29.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. The method of selectively heat-treating wire having an aluminum metal core and a copper metal cladding which is interfacially metallurgically solid-phase bonded therewith, the bond being prone to the formation of intermetallic compounds under substantial heating, comprising;

continuously moving the wire over a path between spaced connections with a high-frequency electric circuit rapidly to induce skin heating in the cladding with a first steep temperature gradient from the cladding surface toward the core, said gradient extending from an elevated annealing temperature in the skin to a sufficiently low temperature at the metallurgical bond to prevent the formation of any substantial amount of intermetallic compounds therein or substantially to raise the core temperature, immediately after completion of said skin heating submerging the moving wire in a quenching liquid thereby rapidly to remove heat from the cladding under a second steep but reverse temperature gradient to complete annealing of the cladding before any sufficient amount of heat reaches the metallurgical bond and the core, thereby to anneal the cladding exclusively and to avoid any substantial formation of intermetallic compounds in the metallurgical bond between the cladding and the core.

2. The method according to claim 1, wherein the wire moves at approximately five hundred feet per minute, the distance moved during heating being approximately two inches, the A.C. frequency being approximately 500 kilocycles and the distance moved through the quenching liquid being several feet.

3. The method according to claim 2, wherein the core is aluminum approximately 0.125 inch in diameter, the cladding is copper approximately 0.010 inch thick and the time interval to induce skin heating of the cladding is approximately 20 milliseconds.

References Cited

UNITED STATES PATENTS

| | | | |
|---|---|---|---|
| 443,464 | 12/1890 | Sedgwick | 148—150 X |
| 1,704,036 | 3/1929 | Cope | 148—154 X |
| 1,722,079 | 7/1929 | Elmen | 148—127 X |
| 2,367,715 | 1/1945 | Chapman | 148—154 X |
| 2,393,363 | 1/1946 | Gold et al. | 148—154 |
| 2,395,195 | 2/1946 | Roberds | 148—150 X |
| 2,679,574 | 5/1954 | Wade | 148—150 X |
| 2,880,552 | 4/1959 | Whitehurst | 148—150 X |
| 2,932,502 | 4/1960 | Rudd et al. | 148—154 X |

CHARLES N. LOVELL, Primary Examiner

U.S. Cl. X.R.

148—150, 154; 219—50, 155